Figures 1, 2:
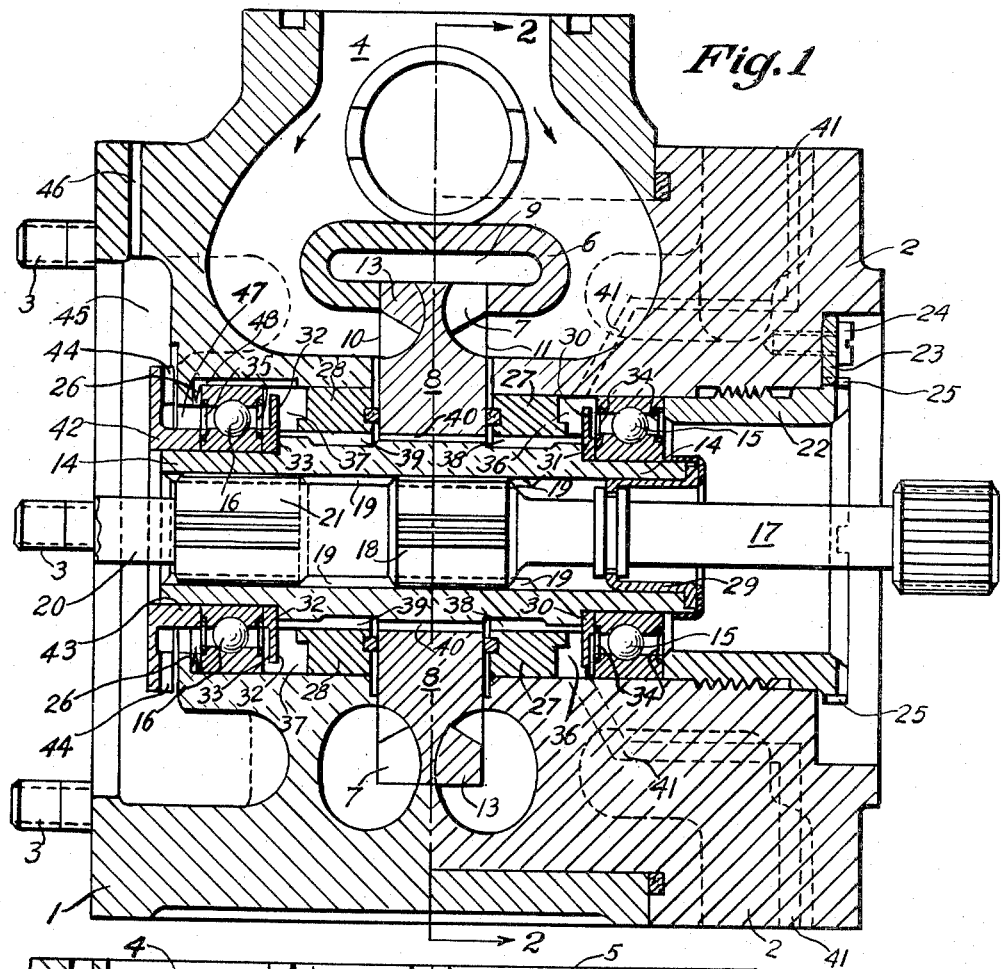

Dec. 25, 1956    P. M. MUELLER    2,775,208
ROTARY PUMPS
Filed April 20, 1953

INVENTOR
P. M. Mueller
BY
ATTORNEY

United States Patent Office 2,775,208
Patented Dec. 25, 1956

2,775,208

ROTARY PUMPS

Paul M. Mueller, West Hartford, Conn., assignor, by mesne assignments, to Pratt & Whitney Company, Incorporated, West Hartford, Conn., a corporation of Delaware Application April 20, 1953, Serial No. 349,685

5 Claims. (Cl. 103—111)

This invention pertains to rotary pumps and more particularly has reference to high speed, rotary pumps of the centrifugal type, commonly employed in aircraft for fuel supply to an internal combustion engine, and for other aircraft accessories where liquid under high pressure and moderate flow is utilized as a medium for motive power. Since such pumps are required to operate at very high speeds (e. g., 25,000 R. P. M.), the rotors are mounted upon ball bearings which are packed with a solid or semi-solid lubricant. In the operation of such pumps, difficulty is experienced in preventing the volatile elements of the pumped hydrocarbon liquids from reaching the ball bearings and either dissolving or destroying the lubricant, so that the bearings eventually are damaged, usually in a matter of a few hours. What adds to difficulty of this problem is that there is no evidence that any of the pumped liquid, which has leaked past the running seals between the rotor and housing, reaches the rotor bearings in liquid form. On the contrary, it appears that the liquid, in working past the running seal surfaces, either volatilizes in its passage therethrough, or immediately thereafter, and reaches the bearings in the vapor state.

The principal object of my invention is to solve this troublesome problem by providing a simple but effective means of preventing the pumped liquid, and particularly its volatile elements, from reaching the ball bearings of the rotor.

While my invention is generally applicable to any type of high speed, rotary pump, in which the rotor is mounted in ball bearings, I have chosen, to illustrate a preferred embodiment of my invention, a vortex pump, of the type shown in the copending application of Alexander M. Wright, Serial No. 254,022, filed October 31, 1951, and assigned to the same assignee as in this application.

With the foregoing and other objects in view which may be incident to my improvements, my invention consists in the combination and arrangement of elements hereinafter described and illustrated in the accompanying drawing, in which:

Figure 1 shows a longitudinal, vertical section of a vortex pump of the type mentioned, in which my invention is incorporated; and Figure 2 is a partial cross-section of the upper half of the pump, along the line 2—2 of Figure 1.

Referring to Figures 1 and 2, the reference numeral 1 denotes the main housing of the pump into which is fitted a matching flange housing 2, secured by a plurality of tap bolts 3 passing through housing 1 and threaded into housing 2. Housings 1 and 2 are provided with contoured internal grooves in their matching faces which define a series of passages for the circulation of fluid from inlet 4 to discharge outlet 5. Inlet 4 is bifurcated by a baffle 6 so that the entering column of fluid is divided into two equal parts which enter buckets 7 on each side of an impeller 8, as clearly shown in Figure 1. Baffle 6 is internally contoured to define a fluid passage 9 which communicates through arcuate ports 10 and 11, respectively, with two parallel passages that merge into a discharge passage 12 leading to outlet 5. By virtue of this arrangement, the fluid entering the impeller 8 is fed into the impeller laterally from each side thereof, and is precluded from shearing contact with the outer periphery of the rotating impeller, as in a conventional vortex pump. This substantially reduces the energy loss and cavitation from turbulence caused by the churning of the fluid in the inlet passage by the cutting of the impeller blades across said passage, as in the conventional vortex pump. The buckets 7 in the periphery of impeller 8 define two series of flat, radial blades 13, spaced in staggered relation with each other.

Impeller 8 is mounted upon and keyed to a hollow cylindrical shaft 14 which is supported by ball bearings 15 and 16 in housings 2 and 1, respectively. Each bearing 15 and 16 is sealed at both ends by grommets 34 and 35 which serve to retain the solid or semi-solid lubricant within the bearing. Shaft 14 is driven by a drive shaft 17 having a grooved head 18 which slidably engages splines 19 on the inner wall of shaft 14, as shown in Figures 1 and 2. Where it is desired to drive a second pump, generator, or other engine accessory, from the drive shaft 17, a connecting shaft 20, having a grooved head 21, may be slidably connected to shaft 14, as shown in Figure 1. Impeller 8 is held in adjustable relation with minimum running clearance, between adjacent surfaces of housings 1 and 2, by a sleeve nut 22 which is threaded into housing 2 and secured in desired adjusted position by a locking ring 23, attached to housing 2 by tap bolt 24, which engages in notches 25 in the periphery of nut 22. An annular corrugated spring 26 bears against ball bearing 16 and opposes the thrust of nut 22 on shaft 14 (through ball bearing 16), so as to secure the accurate centered adjustment of impeller 8. A sleeve 29, which is clamped to the right end of shaft 14, engages a groove on shaft 17 and holds the latter in fixed running position with respect to the former. Carbon sealing rings 27 and 28 are press-fitted into housings 2 and 1 to provide a running fluid seal between the adjacent surfaces of impeller 8 and housings 2 and 1.

An annular flinger disc 30 is mounted on shaft 14 between shoulder 31 and ball bearing 15, and a similar disc 32 is mounted between shoulder 33 and ball bearing 16. Each of these discs has an annular recess in its outer face to provide a clearance between said disc and its adjacent ball bearing. Between each ball bearing 15 and 16 and its adjacent seal rings 27 and 28, there is an annular chamber 36 and 37, which extends over the outer edge of flinger discs 30 and 32. Between the outer surface of shaft 14 and the inner surfaces of seal rings 27 and 28, there are annular spaces 38 and 39 which communicate respectively with annular chambers 36 and 37. A plurality of notches 40 in the outer surface of shaft 14 provide communication between annular spaces 38 and 39, as shown in Figures 1 and 2, and a plurality of passages 41 connect chamber 36 with the atmosphere outside housing 2.

Press-fitted on the left end of shaft 14 is an air pump impeller 42 whose sleeve portion 43 abuts ball bearing 16 and whose blades 44 are spaced from the adjacent portion of housing 1 by a small clearance, as clearly shown in Figure 1. The outer periphery of impeller blades 44 communicates with a circular chamber 45 which is connected by a passage 46 to the outside atmosphere. An annular space 47 communicating with blades 44, is connected by a plurality of grooves 48 with chamber 37.

With the arrangement of parts as described above, it is clear that, upon rotation of shaft 14 and impeller 42, a current of air will be drawn in through passages 41, chamber 36, space 38, passage 40, space 39, chamber 37, grooves 48, and space 47, and will be discharged through impeller blades 44, chamber 45 and passage 46 to the outside atmosphere. Accordingly, any liquid which leaks past seals 27 and 28, and collects in vapor form in spaces 38 and 39, is deflected from ball bearings 15 and 16 by flinger discs 30 and 32 whose rotation with shaft 14 causes said vapor to be projected radially outward by centrifugal force into the path of the air stream flowing through chambers 36 and 37. At the same time, the current of air sweeping through spaces 38 and 39, carries any vapor which is in said spaces through chamber 37, grooves 48, space 47, blades 44 of impeller 42, chamber 45, and passage 46 to the outside atmosphere, thereby eliminating said vapor and preventing it from reaching ball bearings 15 and 16. The lubricant in ball bearings 15 and 16 is thus protected from the dissolving action of the pumped fuel vapors, and the proper lubrication of said bearings is insured.

While I have shown and described the preferred embodiment of my invention, I desire to be understood that I do not limit myself to the precise details of construction and arrangement of elements, as these may be changed and modified by those skilled in the art without departing from the spirit of my invention or exceeding the scope of the appended claims.

I claim:

1. A rotary pump for volatile liquid comprising: a housing, a pair of ball bearings packed with a lubricant and seated in said housing in selected spaced relation thereto; a shaft supported by said bearings in selected spaced relation to said housing, a pumping impeller rotor fixedly mounted on said shaft between said bearings; a plurality of running seals between said rotor and housing; a pair of communicating annular spaces formed by said spaced relation of said shaft and housing and providing a fluid flow passage from one of said bearings to the other; an air passage connecting each of said annular spaces with the atmosphere outside said housing, and an air impeller on said shaft for drawing a current of air in through one of said air passages and one of said annular spaces and discharging said current through the other of said spaces and said air passages, thereby removing from said spaces the vapor of any liquid which has leaked past said seals and thus preventing said vapor from reaching said bearings; whereby said lubricant is protected from the dissolving action of said vapor.

2. A pump according to claim 1, wherein said housing has a chamber, in which said air impeller is mounted, said chamber connecting said other annular space to said other air passage through which air is discharged from said pump.

3. A pump according to claim 1, having means for deflecting said vapor from each of said bearings into the path of said air current, thereby facilitating the elimination of said vapor from said pump.

4. A pump according to claim 3, wherein said vapor projecting means comprises flinger discs mounted upon said shaft and rotating therewith, whereby said vapor is projected into the path of said air current by the centrifugal action of said discs upon said vapor.

5. A pump according to claim 4, wherein each ball bearing has sealing means for retaining said lubricant in said bearings.

References Cited in the file of this patent

UNITED STATES PATENTS

| 2,362,954 | Adams | Nov. 14, 1944 |

FOREIGN PATENTS

| 471,980 | Germany | Jan. 31, 1929 |
| 562,907 | Great Britain | July 20, 1944 |
| 984,338 | France | July 4, 1951 |